US005508472A

United States Patent [19]

Hawkins

[11] Patent Number: 5,508,472

[45] Date of Patent: Apr. 16, 1996

[54] METHOD AND APPARATUS FOR EMULATING THE PITCH VARYING EFFECTS OF PIPE ORGAN WIND SYSTEMS AND ACOUSTIC COUPLING IN AN ELECTRONIC MUSICAL INSTRUMENT

[75] Inventor: W. Lawrence Hawkins, Beaverton, Oreg.

[73] Assignee: Rodgers Instrument Corporation, Hillsboro, Oreg.

[21] Appl. No.: 76,255

[22] Filed: Jun. 11, 1993

[51] Int. Cl.[6] ................................ G10H 5/00; H04Q 1/18

[52] U.S. Cl. ................................ 84/653; 84/686; 84/620

[58] Field of Search ................................ 84/615, 653, 678, 84/692, 620, 686

[56] References Cited

U.S. PATENT DOCUMENTS

| | | | |
|---|---|---|---|
| 3,647,928 | 3/1972 | Turner . | |
| 3,735,014 | 5/1973 | Turner . | |
| 3,992,969 | 11/1976 | Robinson et al. . | |
| 4,008,641 | 2/1977 | Takada et al. . | |
| 4,080,861 | 3/1978 | Wholahan . | |
| 4,418,602 | 12/1983 | Turner . | |
| 5,206,446 | 4/1993 | Matsumoto et al. | 84/624 |

*Primary Examiner*—William M. Shoop, Jr.
*Assistant Examiner*—Jeffrey W. Donels
*Attorney, Agent, or Firm*—Edward B. Anderson

[57] ABSTRACT

Certain effects of pipe organ wind regulators and conductors, as well as certain effects of acoustic coupling of pipes within pipe organs are emulated in an electronic musical instrument. Digital signal processing is used to model the behavior of a pipe organ wind regulating and distributing system as a damped oscillator to which an input disturbance signal is applied. The disturbance signal is derived from the combined on or off state of notes associated with voice generators responsive to the model output. The output is further processed and used to control the absolute pitch of the voice generators. Response controllers regulate the response of the generators individually. By varying the response characteristic of each voice, the relative pitches of the voices diverge as more notes are played, achieving a psychoacoustic effect similar to the detuning produced by wind pressure variations and acoustic coupling among speaking pipes of a pipe organ.

50 Claims, 3 Drawing Sheets

METHOD AND APPARATUS FOR EMULATING THE PITCH VARYING EFFECTS OF PIPE ORGAN WIND SYSTEMS AND ACOUSTIC COUPLING IN AN ELECTRONIC MUSICAL INSTRUMENT

BACKGROUND OF THE INVENTION

1. Field of the Invention

This invention relates to the emulation of pipe organs in an electronic musical instrument, and in particular to the emulation of pipe voice changes due primarily to wind pressure variations and acoustic coupling among speaking pipes.

2. Related Art

In order for an electronic musical instrument to emulate the sound of a pipe organ in a manner which is aesthetically pleasing and convincing to the listener, it is desirable to consider factors other than accurate reproduction of the sounds of individual pipes. Although a pipe organ is composed of many pipes which are essentially independent sound sources, there are certain parameters which affect all pipes, or groups of pipes. Further, because pipes are acoustic oscillators, they are subject to influence from the sound waves produced by neighboring pipes.

Pipes in an organ are grouped upon wooden air chambers called windchests. The latter are filled with air under pressure usually generated by an electric centrifugal blower, although other means may be used for supplying the wind used by the organ, including hand-pumped bellows. Between the blower and the windchest, some type of wind regulating device is typically inserted. This device is normally composed of a bellows coupled to an air valve in such a way that the inflation of the bellows causes the air supply into the bellows to be proportionally decreased. The bellows is fitted with weights or springs which resist its inflation such that the device will reach an equilibrium point at which the amount of higher-pressure air introduced into the bellows through the valve is exactly balanced by the air outflow to the pipes. At this equilibrium point, the air pressure inside the bellows (and thus to the pipes) is practically constant, and determined by the amount of weight or spring force resisting the bellows inflation. An increase in demand as more pipes are played causes the bellows to deflate somewhat, thus opening the valve to admit more air. Again, an equilibrium point is reached which balances inflow and outflow.

It is significant that such a regulating device is not perfect. The mechanical gain of the system can be fairly low, producing an output pressure which may tend to drop as more outflow is required. Further, the elasticity of air and the mass of the moving parts of the bellows and valve produce dynamic instability which can appear as a slow response to changes in wind demand, or as overshoot and oscillation if the system damping is low. If the regulator is not in close proximity to the windchest, or if a single regulator serves several windchests, suitable conductors for the pressurized air must be used. These can produce further instability, since they act as a resonant column for the air inside. Pressure loss due to friction may also occur as the air velocity increases in such a conductor.

Although pipe organ builders usually try to design for the best possible regulation of wind, there is always some error, and this error produces subtle changes in pipe pitch and speech. A certain amount of wind "flexibility" is inherent in almost all pipe organs, and actually contributes to the aural signature of the instrument. The extent to which the variations in wind pressure are obvious to the listener varies with the style and heritage of the organ and in some cases introduces desirable nuances into the playing of certain types of organ literature.

A second factor which affects pipe speech when large numbers of pipes are played simultaneously involves the acoustic coupling among neighboring pipes. Since an organ pipe is an acoustic oscillator, it may be influenced by externally-generated sound waves which have frequency components close to those produced by the pipe. This effect is well known by organ tuners as "drawing," and makes the tuning of some pipes difficult because of their tendency to lock on to a nearby pitch. When many pipes of different pitches are played together, a very complex set of fundamental and harmonic frequencies is generated. Some of these frequencies are very close together (within a few Hertz), particularly due to natural harmonics of some notes being close to tempered fundamentals or harmonics of other notes. The audible result of this extremely complex interaction is a gradual detuning of the organ as more pipes are played. This detuning is in addition to the detuning caused by the aforementioned variations in wind pressure.

Although one might expect this detuning to be unpleasant to the human ear, quite the reverse is true. When the human ear is presented with a great number of pitches, as when many pipes are played on a pipe organ, the ear tends to average pitches which are near each other into a single pitch. If it were not for the detuning phenomena described above, a pipe organ would in fact lose some of its aesthetic appeal as more pipes are played, since the multitude of pitches which make up the organ ensemble would no longer be discernable as such. Likewise, electronic organs attempting to recreate the effect of a full pipe organ ensemble will suffer to a degree if sufficient detuning is not provided when many voices are played together. Builders of such instruments have typically resorted to providing a fixed amount of detuning which is always present. Although this improves the full ensemble, it can result in excessive and unpleasant out-of-tuneness when only a few voices are played.

In summary, two factors have been discussed which affect the speech of organ pipes. The first involves the effect of variations in pressure of the wind applied to the pipes, said variations being caused by imperfect operation of wind pressure regulators, and by resonance and friction in the wind conductors. The second factor involves the acoustic coupling among neighboring pipes, causing the pitch of the pipes to be altered as more pipes are played simultaneously.

SUMMARY OF THE INVENTION

It is therefore one feature of the present invention to emulate, in an electronic organ or other electronic musical instrument, the aforementioned wind pressure variations and the effect of these variations upon organ pipes.

The preferred embodiment disclosed herein employs an electrical model which emulates the behavior of a pipe organ wind regulator and conductor by relating such behavior to that of a damped oscillator. The output from the model is applied to a plurality of voice generators. The model output is varied separately for each generator to correlate the effect of the model to the voice generated. The input stimulus to the model is a signal derived from the total number of voice generators currently playing as determined by the number of keys and stops that are activated. Further, the voice generators of an electronic organ or other electronic musical instrument made according to the present invention preferably are subdivided into groups, with each group connected to a separate wind regulator model. This provides multiple independent wind system emulators for different sections of the instrument.

The damping of the regulator model can be adjusted to provide varying behavior upon application of input stimulus resulting from keys being played or released. With minimal damping, the output will exhibit overshoot and ringing. The frequency of such oscillation can likewise be adjusted—typical values are in the range of 2 to 5 Hertz. With more damping, the output will respond slowly to input changes, eventually reaching equilibrium if the input remains static. Since most pipe organ wind systems exhibit a slightly to moderately underdamped characteristic, with some overshoot and perhaps one or two cycles of ringing, this is the most useful range of behavior for the wind regulator model. The output signal from the wind regulator model affects the pitch (and possibly other parameters such as harmonic content) of the voice generators, thus emulating the effect of wind pressure variation upon organ pipes.

Another feature of the present invention is to provide, in an electronic organ or other electronic musical instrument, a gradual increase in relative detuning of voices in proportion to the number of active speaking tones, in order to emulate the effect of acoustic coupling among the pipes of a pipe organ.

In the preferred embodiment the degradation in tuning caused by acoustic coupling among neighboring pipes is emulated by applying some of the input signal to the regulator model directly to the generators. The response of each generator to this signal is also separately controlled. This signal may be separate from, or may be superimposed upon (combined with) the output signal from the model. By defining a different response for each generator, the overall tuning diverges with an increase in the input signal. An analogous characteristic exists for organ pipes, since some pipes such as large-scale Flutes tend to deviate more easily in pitch than smaller-scale pipes such as Principals and Strings. This behavior applies also to the response of pipes to variations in wind pressure. One embodiment of the present invention produces a combined output from the wind regulator model which includes elements of both the aforementioned signals.

These and other features and advantages of the present invention will be apparent from the following detailed description of the preferred embodiment of the invention and the accompanying drawings.

DETAILED DESCRIPTION OF THE PREFERRED EMBODIMENT

Figure 1:
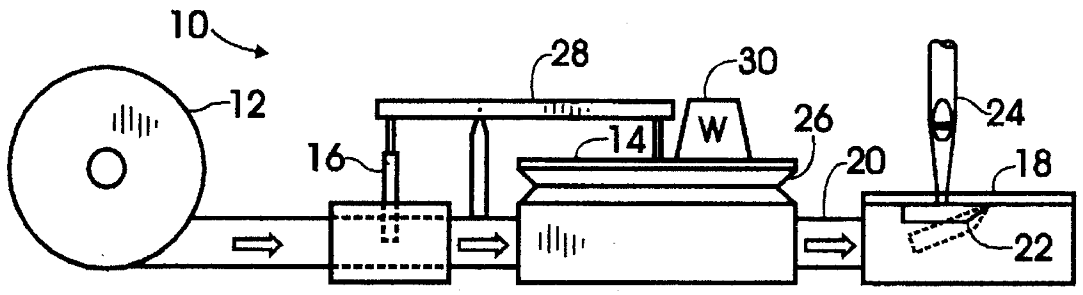
Fig. 1 (PRIOR ART)
FIG. 1 is a simplified depiction of a conventional pipe organ wind system.

FIG. 1 illustrates the basic elements of a pipe organ wind system 10, the emulation of which is one of the objects of the present invention. A centrifugal blower 12 supplies air under pressure to a wind regulator 14 through a gate valve 16. Regulator 14 in turn provides air to a windchest 18 through a conductor 20. At resting equilibrium, a pipe valve 22 and gate valve 16 are both closed, and there is no air flow through the system. If pipe valve 22 then opens, air will flow out of regulator 14 into windchest 18, and out through a pipe 24, causing the pipe to speak. The outflow from regulator 14 causes a regulator bellows 26 to collapse a small distance, opening gate valve 16 via a lever 28. Air now flows from blower 12 into regulator 14. If pipe valve 22 remains open, a new equilibrium point is eventually reached at which the inflow to regulator 14 exactly matches the outflow to pipe 24. The pressure of the air supplied to windchest 18 from the regulator is necessarily lower than the pressure supplied by blower 12, and is mainly determined by the balancing force exerted upon the regulator bellows by a weight 30.

Figure 2:
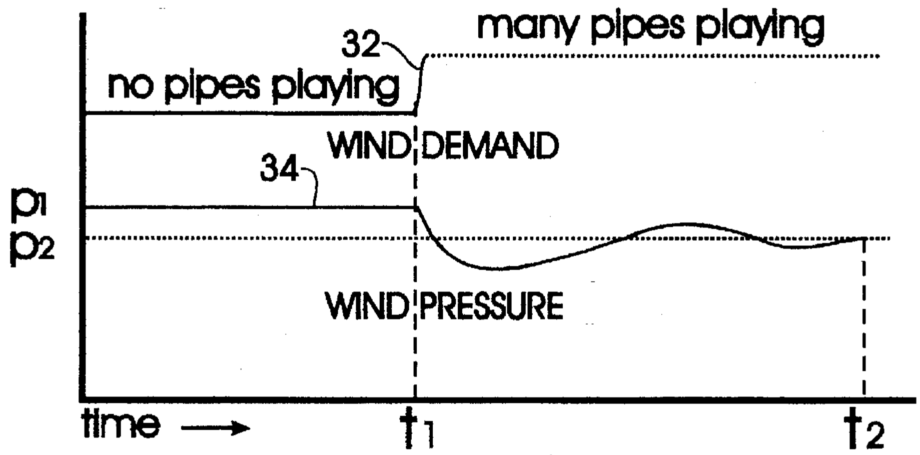
FIG. 2 is a graph showing a typical pipe organ wind pressure response to a large change in wind demand.

The establishment of a new equilibrium point when the demand for wind changes due to pipe valves opening or closing does not occur instantaneously. The mass of weight 30 combined with that of the moving parts of regulator 14, lever 28, and gate valve 16 introduces an inertial element into the response. Typical system parameters and pressure differentials will result in a response similar to that depicted in FIG. 2. The upper line 32 of this graph shows a sudden increase in wind demand at time $t_1$, and the lower line 34 illustrates the resulting changes in the air pressure inside the windchest. Because of the aforementioned inertial factors, there is an initial drop in pressure due to the inability of the regulator bellows to instantaneously deflate. As the regulator bellows goes into motion and begins to deflate, the opening of the gate valve causes the pressure to increase toward the desired value. When the desired pressure is reached, though, the bellows and weight are still in motion. Due to their inability to stop instantaneously, the pressure continues to rise above the desired value. This cyclical "hunting" process continues, diminishing until the new equilibrium point is reached at time $t_2$. As illustrated in FIG. 2, the windchest pressure, $P_2$, at this point may be somewhat lower than the original pressure, $P_1$, at lower air flow. This may happen due to low mechanical gain of the bellows/valve system, or due to air friction in long wind conductors between the regulator and the windchest. Of course, the errors shown in FIG. 2 are exaggerated for purposes of demonstration.

Figure 3:
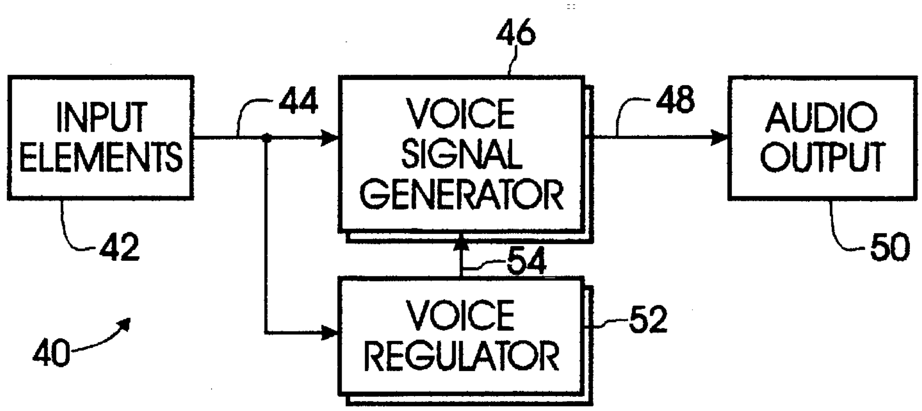
FIG. 3 is a simplified block diagram of an electronic musical instrument made according to the invention.

FIG. 3 illustrates generally an electronic musical instrument 40 made according to the present invention. Instrument 40 includes a set 42 of input elements for selecting different voices and notes to be played or during play. For simplicity, notes and voices are referred to generally as voices. The input elements selected generate an input signal on line 44 that is received by a voice signal generator 46. One or more voice signals are generated by generator 46 on line 48 that is used to produce an audio output at block 50. This is the basic structure of a conventional electronic musical instrument.

The input signal on line 44 is also fed to a voice regulator 52 made according to the invention for emulating wind pressure and/or acoustic coupling changes of organ pipes as described generally above. Regulator 52 generates one or more control signals represented by line 54 for controlling parameters of the voices generated by generator 46 by methods that are well known. In the preferred embodiment only the pitch of the voice(s) is(are) controlled. Additional voice parameters, such as harmonic content, could also be varied.

Figure 4:
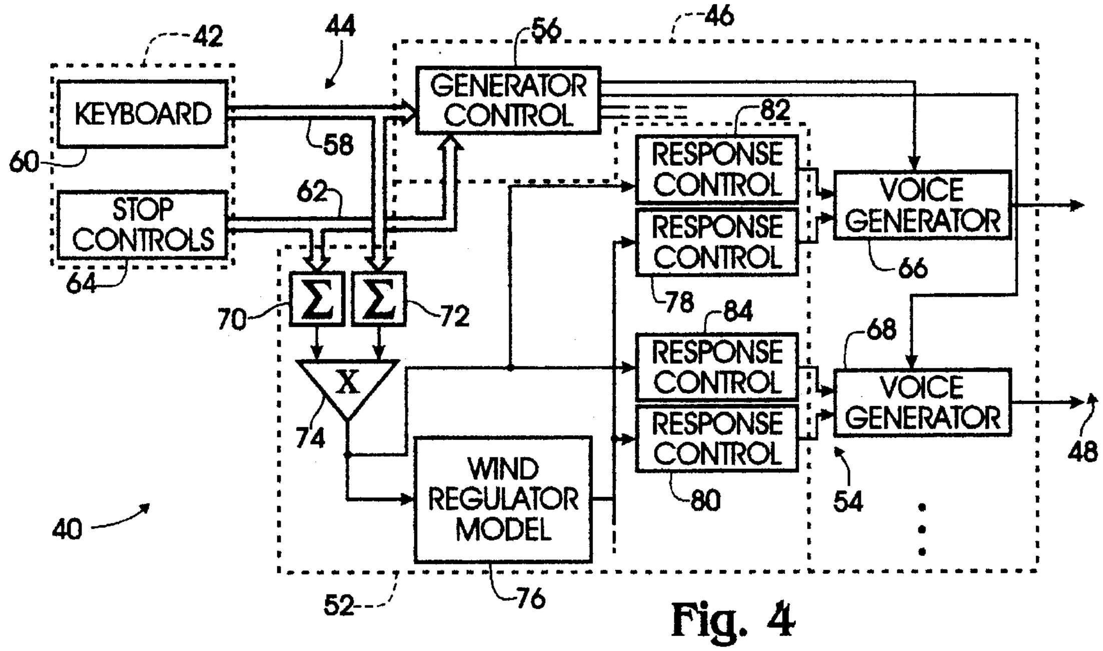
FIG. 4 is a functional block diagram of the preferred embodiment of the present invention.

FIG. 4 shows an instrument 40 as a keyboard instrument, such as an electronic organ. A generator control unit 56 receives inputs on a key bus 58 from keys or key switches on a keyboard 60, as well as on a stop bus 62 from stop controls 64. The function of generator control unit 56 is to selectively activate and deactivate voice generators in response to inputs from keyboard 60 and stop controls 64. These inputs represent the activation or deactivation of keys and/or stop controls. Methods for accomplishing voice generator control in electronic musical instruments are well known by those in the field. For brevity of explanation, only two voice generators 66 and 68 are shown. It should be understood, however, that the present invention can be applied to electronic musical instruments containing any number of such voice generators.

Accumulators 70 and 72 also receive inputs from keyboard 60 and stop controls 64 respectively. This input information, representing the activation or deactivation of keys and stop controls, is used to derive a signal which is an approximate electrical equivalent of the magnitude of the instantaneous wind demand of a pipe organ containing voices which are characteristically similar to those assigned to stop controls 64. In this regard, the inputs to accumulator 70 from stop controls 64 preferably represent not only the on or off status of each voice, but also a "wind usage value" representing for each stop control the equivalent wind usage of a characteristically similar pipe voice. For instance, representative relative wind usage values for voices of 8-foot, 4-foot and 2-foot pitch are 1.0, 0.5, and 0.25, respectively. Likewise, the inputs to accumulator 72 from keyboard 60 preferably contain a value for each active key switch regarding its pitch position. Thus, keys in the first, second, third and fourth octaves could be assigned relative values of 1.0, 0.5, 0.25 and 0.125, respectively, since the lower-octave pipes have higher wind usage.

Accumulator 72 maintains a sum of the key pitch position values from all active key switches, while accumulator 70 maintains a sum of all wind usage values from all active stop controls. These two sums are passed to a multiplier 74, where they are multiplied to produce a total value representing an equivalent net instantaneous wind usage. The wind usage total value is thus proportional to the number of keys times the number of voices selected for those keys. This overall wind usage value is recomputed each time the status of any key switch or stop control changes. A simpler but less preferable embodiment of the invention eliminates the key pitch position and stop control wind usage values, and maintains via accumulators 70 and 72 only a count of active notes and a count of active stop controls, these counts being multiplied by multiplier 74 to produce the aforementioned overall wind usage value.

The output of multiplier 74 is used to drive wind regulator model unit 76. This unit processes the signal representing the overall wind usage computed by multiplier 74, and outputs a signal representing an equivalent wind pressure response to be applied to the voice generators. The response of the exemplary voice generators 66 and 68 to the output of wind regulator model unit 76 is defined by response controls 78 and 80 respectively. These convert the output of wind regulator model unit 76 into signals which are used to control voice generator pitch, and possibly other parameters such as harmonic content. The magnitude and/or character of the response is defined for each voice generator individually. If voice generators 66 and 68 represent flute and principal voices, respectively, then representative relative pitch response control factors could be 1.5 and 1.0, respectively. Common response control factors may also be defined for any desired group(s) of voice generators. Methods for controlling and altering parameters such as pitch in voice generators used by electronic musical instruments are well known by those in the field.

In addition to the stimulus from wind regulator model unit 76, a portion of the output from multiplier 74 is also applied to the voice generators through response controls 82 and 84, which operate in a fashion similar to that of response controls 78 and 80 previously discussed. Since the output of multiplier 74 is a signal which increases in magnitude as more voice generators become active, this signal is preferably used to increase the overall detuning among the voice generators as the number of playing generators increases, thus emulating the effects of acoustic coupling previously discussed herein. This increase in overall detuning is effected by defining different responses for different voice generators in the response controls, of which 82 and 84 are typical. For example, response control 82 could cause the pitch of voice generator 66 to rise with an increase in the input to response control 82. Conversely, response control 84 could cause the pitch of voice generator 68 to fall with the; same increase in input stimulus to response control 84. Thus, if the nominal pitches of voice generators 66 and 68 are identical or harmonically related, the tuning between the two generators would diverge as the magnitude of the stimulus from multiplier 74 increased.

Figure 5:
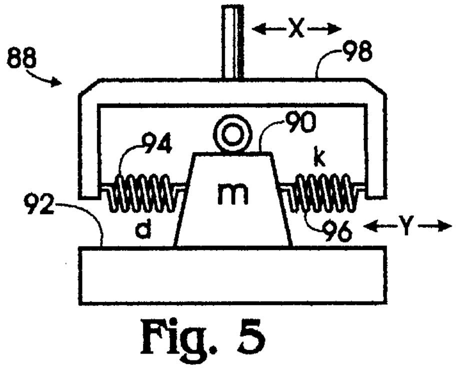
FIG. 5 is a simplified illustration of a mechanical system equivalent in operation to the wind regulator shown in FIG. 1.

The operation of wind regulator model unit 76 may be understood by relating the model to the equivalent mechanical system 88 shown in FIG. 5. A mass 90 rests upon a fixed surface 92, and is held in position by springs 94 and 96. An actuator 98 may be moved horizontally a distance X, causing the tension of springs 94 and 96 to become unequal, thus applying a net horizontal force to mass 90. This force is assumed to be directly proportional to the distance (X-Y) by which mass 90 is displaced from the vertical centerline of actuator 98. Further, a viscous frictional force, represented by d, exists between surface 92 and mass 90. This force is assumed to be directly proportional to and opposite in direction from the instantaneous horizontal velocity of mass 90.

Figure 6:
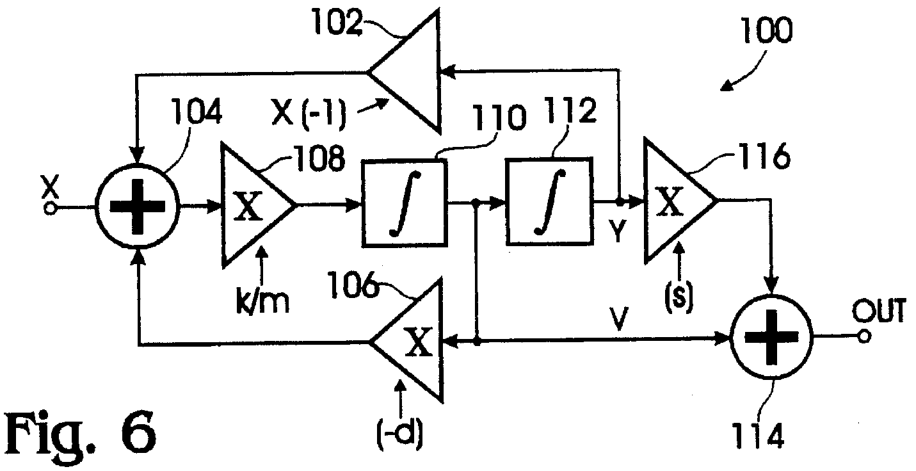
FIG. 6 is a functional block diagram of an analog embodiment of a wind regulator model incorporated in the embodiment of FIG. 4.

FIG. 6 shows an analog regulator 100 that is mathematically equivalent to mechanical system 98. An input value X corresponds to the position of actuator 98. The sign of the position Y of mass 90 is changed at 102, and the resulting value is added to input value X by an adder 104. Ignoring for a moment the contribution of a multiplier 106, the resulting difference in the two positions X and Y is multiplied by multiplier 108 using a factor equal to the net spring constant k divided by the net mass m. A representative value for k/m is 630.0. The result of this calculation is the net instantaneous acceleration of the mass 90 which is then applied to the input of an integrator 110. Assuming Newtonian equations of motion are applicable to the system, the output of integrator 110 equal to the instantaneous velocity V of mass 90. This value is then applied to the input of a second integrator 112, which, according to the aforementioned equations of motion, produces an output equal to the instantaneous position Y of mass 90.

Returning now to adder 104, the instantaneous velocity value output from integrator 110 is multiplied by a negative constant, −d, by a multiplier 106, then fed back to adder 104. It can be seen that the value generated by multiplier 106 is proportional to the instantaneous velocity value generated by integrator 110, and by virtue of its negative sign opposes the difference value generated by adder 104. This opposing component is equivalent to the aforementioned viscous damping property of surface 92.

As the magnitude of the constant d increases, the system will progress from underdamped (oscillatory) behavior toward overdamped behavior. A representative value for d for a critically damped response is approximately 0.0008. In the underdamped case, the frequency of oscillation or ringing in Hertz will be approximately:

$$f = \frac{\sqrt{k/m}}{2\pi}$$

When the system is at rest, the values of positions X and Y will be equal, and velocity V will be zero. The output of the mathematical model of regulator 100 is formed by summing a portion of the position Y value with the velocity V value in an adder 114. The desired proportional part of the position value is extracted by multiplying it by the fractional constant s in a multiplier 116. The output formed by mixing position and velocity values is made to closely resemble the wind pressure variations appearing at the output of a mechanical wind regulating device. When the system is at rest, the velocity V is zero, while the position Y is equal to the static input value X. By summing part of the position value with the velocity, the resulting output value at rest will be offset from zero by an amount directly proportional to Y (and thus also to X). This offset is analogous to a drop in wind pressure output from a wind regulating device that is proportional to the net wind outflow (demand) from the regulator. By adjusting the constant multiplier s in FIG. 6, an output offset equivalent to any desired pressure drop can be set.

The mathematical model on which FIG. 6 is based as discussed in the preceding paragraphs can be electrically implemented in several ways. The most straightforward method is to replace each component of the mathematical model with its functional analog electrical equivalent. Thus, the connecting lines in FIG. 6 represent electrical conductors, and the functional elements of the system are provided by active or passive electrical circuitry for processing of analog (continuously variable voltage or current) signals. Such circuit elements are well known to those in the field of electronic musical instruments. To be useful in the context of an electronic musical instrument which employs digital control values instead of analog voltages, the embodiment discussed in the preceding paragraph would require a digital-to-analog converter at its input, and an analog-to-digital converter at its output.

Figure 7:
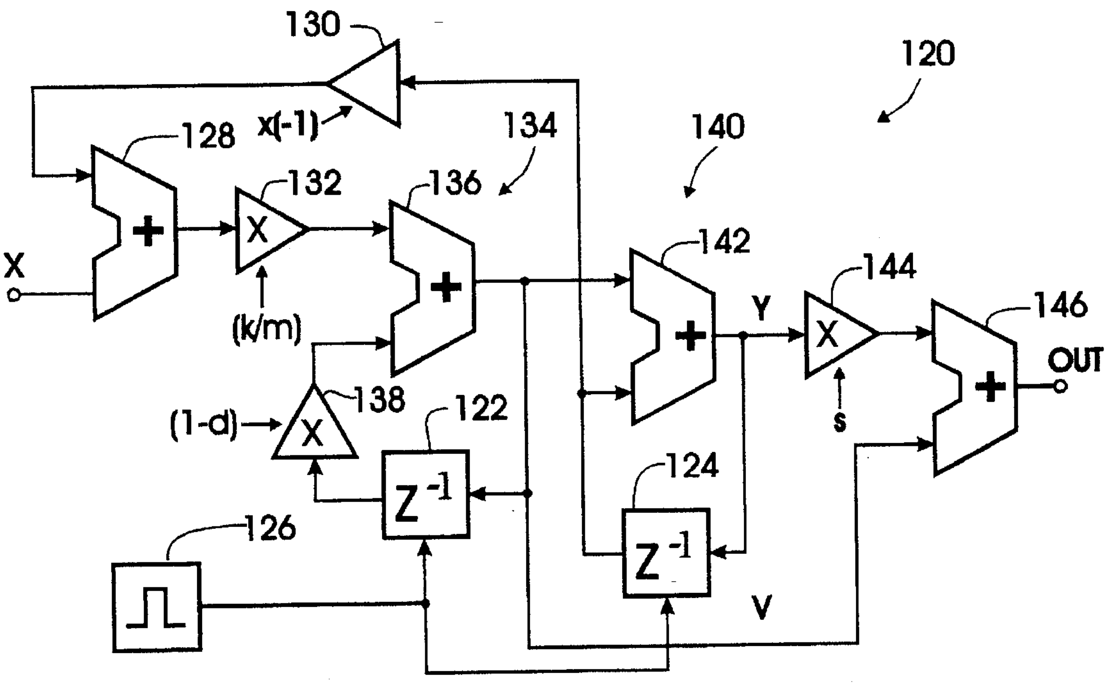
FIG. 7 is a functional block diagram of a digital embodiment equivalent to the embodiment of FIG. 6.

An alternate and more advantageous embodiment of the wind regulator model using digital signal processing techniques is envisioned for this type of application. A functional diagram of such a regulator 120 is shown in FIG. 7. In this diagram, all connecting paths are assumed to carry numerical values of some arbitrary precision. Values are assumed to be transferred instantaneously from input to output in all functional blocks except delay registers 122 and 124. Each of these contains a latch which maintains the output at a constant numerical value until the arrival of a clock pulse, which causes the latch to replace the value with the value present at the input upon arrival of the clock pulse. Repetitive clock pulses are generated by a sample clock generator 126 at a rate sufficient to produce some arbitrary time interval resolution and granularity of the output values from the wind regulator model. The faster the clock rate, the more accurate is the resolution of the model, and the more output values are produced over a given time interval. Clock frequencies from ten to fifty times the natural oscillatory frequency of the model are typical for the preferred embodiment. It is further assumed that the input value X changes only once per clock pulse, the change occurring immediately following the application of each clock pulse to the delay registers 122 and 124. Likewise, it is assumed that the output value is to be sampled just before the application of each clock pulse. The regulator depicted in FIG. 7 is a type of digital filter circuit utilizing sampling techniques that are well known by those in the field of digital electronic musical instruments.

Referring to FIG. 7, the input X is applied to an adder 128, where it is summed with the value output from a negator 130, whose function is to change the sign of the output from delay register 124, which represents the delayed output Y of the model at the previous sample period. Thus the value X−Y is applied to the input of a multiplier 132, where it is multiplied by a constant equal to k/m as in the mathematical model previously discussed. The output of multiplier 132 is then applied to a first integrator 134 composed of an adder 136, delay register 122, and a multiplier 138. The constant multiplier (1−d) has an effect equivalent to multiplier 106 in FIG. 6, and applies a controllable amount of damping to the system. Typical values for d in this configuration preferably range from 0.4 to 0.7. The output of the first integrator, which is the equivalent to the velocity V output of the mathematical model, is then applied to the input of a second integrator 140 composed of an adder 142 and delay register 124. This second integrator 140 produces the Y (position) output. As in the mathematical model of FIG. 6, the output of the model is produced by summing the velocity V output with a portion of the position Y output extracted by multiplying the Y value by the fractional constant s in a multiplier 144. The summing is carried out by an adder 146. It can be shown that this embodiment of the wind regulator model is functionally equivalent to the mathematical model of FIG. 4.

The values of constant multipliers k/m, (1−d), and s are set to provide the desired response for the wind regulator model, and can be changed even while the model is in operation in order to change the desired response. Such a change in multiplier values is preferably provided by one or more physical controls available to the user, as represented by the associated arrows in FIG. 7, in order to provide multiple selectable operating modes for the wind regulator model.

In addition to the stimulus provided by the output of the wind regulator model, the embodiment of the present invention shown in FIG. 4 incorporates a separate signal path from the output of multiplier 74 through response controls 82 and 84 to the voice generators, of which 66 and 68 are representative. This additional stimulus provides for emulation of overall detuning resulting from acoustic coupling among sounding pipes. An alternate embodiment of the invention eliminates the necessity for a separate signal path to provide for the emulation of overall detuning. In this alternate embodiment, the value of the aforementioned constant multiplier s in the wind regulator model is chosen to produce a net component of the wind regulator model output which is proportional to the input to the model, as described above. A typical value of s is 0.25. This net component thus increases in magnitude with the number of active voice generators. If different pitch responses are defined for each voice generator or voice generator group, the overall tuning of all voice generators diverges as the number of active generators increases. This embodiment represents only a minimal compromise in the accuracy of emulation, while eliminating one of the response controls for each voice generator or voice generator group.

Since organ pipes of different voices exhibit different degrees of pitch and timbre variation with a given change in wind pressure, this approach accurately emulates overall detuning due to wind pressure drop. Overall detuning due to acoustic coupling, however, involves pitch variations which are much less predictable, that is, more random. If the response controls are set to emulate a correct variation in pitch and/or timbre with changes in wind pressure (wind pressure drop produces a drop in pitch and a possible decrease in harmonic content), this response will not be strictly equivalent to the variations produced by acoustic coupling, which can cause pipes to either rise or fall in pitch. The emulation of overall detuning produced by wind pressure drop has, in practice, been found to produce the desired aesthetic effect, as the human ear appears to discern more the presence or absence of overall detuning rather than its exact characteristics.

It will be apparent to one skilled in the art that variations in form and detail may be made in the preferred embodiment without varying from the spirit and scope of the invention as defined in the claims, including any modification of the claim language or meaning as provided under the doctrine of equivalents. For instance, if it is desired to change pitch to emulate acoustical coupling only, the wind regulators are not required. Also, the wind regulator may be used without the acoustical coupling signal. If both are used, they can control different frequency parameters, or can be combined into a single signal to control one parameter, such as pitch. They can be combined by the voice generator, by a single response control, or in the regulator, as has been mentioned. The values of the constants can be varied to achieve different aesthetic results. Additionally, the preferred embodiment has been described as a hardware design. The design described is also directly implementable as described with a software design, or a combination of hardware and software. The preferred embodiment is thus provided for purposes of explanation and illustration, but not limitation.

I claim:

1. An electronic musical instrument comprising:

input means having a plurality of individually activatable input elements for selecting different combinations of voices;

voice generator means responsive to the input means for generating at least one voice signal representative of the selected combination of voices including at least one voice having at least one frequency, the generator means also being responsive to at least one control signal for varying the at least one frequency of the at least one voice represented by the at least one voice signal; and regulator means responsive to the input means for generating the at least one control signal corresponding to the selected combination of voices for varying the at least one frequency of the at least one voice differently for different combinations of voices.

2. An instrument according to claim 1 wherein the regulator means generates the control signal so that the at least one frequency of the voice signal varies according to the number of voices selected simultaneously.

3. An instrument according to claim I wherein at least a portion of the different voices are different notes, and at least a portion of the input elements are activatable for selecting the different notes, and the regulator means generates the control signal for varying the pitch of at least one note differently for different combinations of voices.

4. An instrument according to claim 3 wherein the regulator means generates the control signal according to the number of input elements selected simultaneously so that the pitch of the at least one note is varied more when more input elements are activated.

5. An electronic musical instrument comprising:

input means having a plurality of individually activatable input elements for selecting different combinations of voices;

voice generator means responsive to the input means for generating at least one voice signal representative of the selected combination of voices including at least one voice having at least one controlable parameter, the generator means also being responsive to at least one control signal for varying the at least one parameter of the at least one voice represented by the at least one voice signal; and regulator means responsive to the input means for generating the control signal, the regulator means being responsive to changes in the selected combination of voices for changing the level of the control signal according to a damped oscillatory response.

6. An instrument according to claim 5 wherein the damped response is determined by a damping factor, and the instrument further comprises means for varying the damping factor.

7. An instrument according to claim 5 wherein the response oscillates at a known frequency, thereby producing an oscillating change in the at least one frequency of the at least one voice.

8. An instrument according to claim 7 further comprising means for varying the frequency of oscillation.

9. An electronic musical instrument comprising:

input means having a plurality of individually activatable input elements for selecting different combinations of voices, with each voice having a pitch corresponding to a note of the musical scale;

voice generator means responsive to the input means for generating at least one voice signal representative of a selected combination of voices, and responsive to at least one control signal for varying the frequency of each voice represented by the at least one voice signal; and regulator means responsive to the input means for generating the at least one control signal corresponding to the selected combination of voices for varying the frequency of each voice from the pitch for that voice within a range of frequencies that increases with increasing numbers of voices.

10. An instrument according to claim 9 wherein at least a portion of the voices have the same primary pitch and the frequencies of the voices having the same pitch are varied different amounts.

11. An electronic musical instrument comprising:

keyboard means having a plurality of individually selectable keys corresponding to notes of the musical scale;

stop control means having a plurality of individually selectable switches corresponding to voices for the notes selected on the keyboard means;

a plurality of voice generator means, each generator means being responsive to an associated voice control signal for generating a voice signal representative of at least one selected voice at at least one selected note, and responsive to at least one frequency control signal for varying at least one frequency of the at least one voice represented by the at least one voice signal;

generator control means responsive to the keyboard means and the stop control means for generating voice control signals for controlling operation of the plurality of voice generator means according to the selected keys and switches; and regulator means responsive to the keyboard means and the stop control means for generating the at least one frequency control signal corresponding to the selected combination of voices and keys for varying at least one frequency of at least one voice generated by at least one of the voice generator means in proportion to the number of selected keys and voices.

12. An instrument according to claim 11 wherein the regulator means generates different frequency control signals for different voice generator means for varying the responses of the different voice generator means to the frequency control signals.

13. An instrument according to claim 11 wherein the regulator means generates the frequency control signal according to the pitch of the note corresponding to a currently selected key.

14. An instrument according to claim 13 wherein the regulator means generates the frequency control signal so that the change in the frequency in the resulting voice decreases with increasing pitch in the note corresponding to the currently selected key.

15. An instrument according to claim 11 wherein the regulator means generates the frequency control signal according to the voice corresponding to a currently selected switch.

16. An instrument according to claim 11 wherein the regulator means generates a key signal representative of the selected keys and a stop signal representative of the selected switches, and generates the frequency control signal to be a representation of the multiplication of the key signal and the stop signal.

17. An instrument according to claim 16 wherein the regulator means generates the key signal according to the pitch of the note corresponding to a currently selected key.

18. An instrument according to claim 17 wherein the regulator means generates the frequency control signal so that the change in the frequency in the resulting voice decreases with increasing pitch in the note corresponding to the currently selected key.

19. An instrument according to claim 16 wherein the regulator means generates the stop signal according to the voice corresponding to a currently selected switch.

20. An instrument according to claim 11 wherein the regulator means changes the frequency control signal when there is a change in the combination of selected switches and keys, to be representative of the new combination of selected switches and keys.

21. An instrument according to claim 20 wherein the regulator means generates the frequency control signal to have a level representative of the combination of selected switches and keys, and changes the level of the frequency control signal when the combination of switches and keys changes.

22. An instrument according to claim 21 wherein the regulator means changes the level of the frequency control signal according to a damped oscillatory response.

23. An instrument according to claim 22 wherein the damped response is determined by a damping factor, and the instrument further comprises means for varying the damping factor.

24. An instrument according to claim 22 wherein the response oscillates at a known frequency, thereby producing an oscillating change in the at least one frequency of the at least one voice.

25. An instrument according to claim 24 further comprising means for varying the frequency of oscillation.

26. An instrument according to claim 11 wherein the regulator means generates the frequency control signal to be representative of both the product of the number of selected switches and the number of selected keys, and changes the level of the frequency control signal in response to a change in the combination of selected switches and keys with a damped oscillatory response.

27. A method of varying a voice on an electronic musical instrument comprising the steps of:

activating a plurality of individually activatable input elements for selecting different combinations of voices;

generating at least one voice signal representative of each selected combination of voices including at least one voice having at least one frequency;

generating at least one control signal corresponding to each selected combination of voices, whereby the control signal changes in response to changes in the activated input elements;

varying the at least one frequency of the at least one voice represented by the at least one voice signal in response to the changes in the at least one control signal, and thereby varying the at least one frequency of the at least one voice differently for different combinations of selected voices.

28. A method according to claim 27 wherein the step of generating includes generating the control signal so that the at least one frequency of the voice signal varies according to the number of voices selected simultaneously.

29. A method according to claim 27 wherein at least a portion of the different voices are different notes, and at least a portion of the input elements are activatable for selecting the different notes, and the step of generating includes generating the control signal for varying the pitch of at least one note differently for different combinations of voices.

30. A method according to claim 29 wherein the step of generating includes generating the control signal according to the number of input elements selected simultaneously so that the pitch of the at least one note is varied more when more input elements are activated.

31. A method of varying a voice on an electronic musical instrument comprising the steps of:

activating sequentially different pluralities of individually activatable input elements for selecting different combinations of voices;

generating at least one voice signal representative of the selected different combinations of voices including at least one voice having at least one controllable parameter; and varying the at least one parameter of the at least one voice represented by the at least one voice signal with a damped oscillatory response when the combination of selected voices changes.

32. A method according to claim 31 wherein the damped response is determined by a damping factor, and the method further comprises the step of varying the damping factor.

33. A method according to claim 31 wherein the step of varying includes varying the at least one parameter with a damped response that oscillates at a known frequency so that the at least one frequency is modulated at the known frequency.

34. A method according to claim 33 further comprising the step of varying the frequency of oscillation.

35. A method of varying a voice on an electronic musical instrument comprising the steps of:

activating sequentially pluralities of individually activatable input elements for selecting different combinations of voices, with each voice having a pitch corresponding to a note of the musical scale;

generating at least one voice signal representative of the selected different combinations of voices; and varying the frequency of at least one voice from the pitch for that voice within a range of frequencies that increases with increasing numbers of voices selected.

36. A method according to claim 35 wherein at least a portion of the voices have the same pitch and the step of varying includes varying the frequencies of the voices having the same pitch different amounts.

37. A method of emulating the playing of pipes of a pipe organ on an electronic musical instrument comprising the steps of:

selecting simultaneously a plurality of individually selectable keys corresponding to notes of the musical scale and switches corresponding to voices for the selected notes;

generating a plurality of voice signals according to the selected keys and switches, each voice signal being representative of at least one selected voice at at least one selected note;

varying at least one frequency of at least one voice of at least one voice signal in proportion to the number of selected keys and voices.

38. A method according to claim 37 wherein the step of varying includes varying differently the frequencies of voices represented by different voice signals.

39. A method according to claim 37 wherein the step of varying includes varying different frequencies by different amounts according to the pitch of the note of the corresponding selected key.

40. A method according to claim 39 wherein the step of varying includes varying the frequencies by amounts that decrease with increasing pitch of the note corresponding to the selected key, whereby the pitch change in the resulting voice decreases with increasing pitch.

41. A method according to claim 37 wherein the step of varying includes varying the frequencies according to the voice corresponding to a currently selected switch.

42. A method according to claim 37 wherein the step of varying includes varying the frequencies in proportion to the multiplication of a number representative of the number of keys selected and a number representative of the number of switches selected.

43. A method according to claim 42 wherein the step of varying includes varying the frequency according to the pitch of a note corresponding to a currently selected key prior to multiplying the number representative of the number of keys and the number representative of the number of switches.

44. A method according to claim 43 wherein the step of varying includes varying the frequency so that the change in the frequency in the resulting voice decreases with increasing pitch of the corresponding note of the currently selected key.

45. A method according to claim 42 wherein the step of varying includes varying the frequency according to the voice corresponding to a currently selected switch, prior to multiplying the number representative of the number of keys and the number representative of the number of switches.

46. A method according to claim 37 wherein the step of varying includes varying the frequency according to a damped oscillatory response.

47. A method according to claim 46 wherein the step of varying further comprises the steps of determining the damped response by a damping factor, and varying the damping factor prior to the step of determining.

48. A method according to claim 46 wherein the response oscillates at a known frequency, thereby producing an oscillating change in the at least one frequency of the at least one voice.

49. A method according to claim 48 wherein the step of varying further comprises varying the frequency of oscillation of the response.

50. A method according to claim 37 wherein the step of varying includes varying the frequency according to the product of the number of selected switches and the number of selected keys, with a damped oscillatory response.

* * * * *